UNITED STATES PATENT OFFICE.

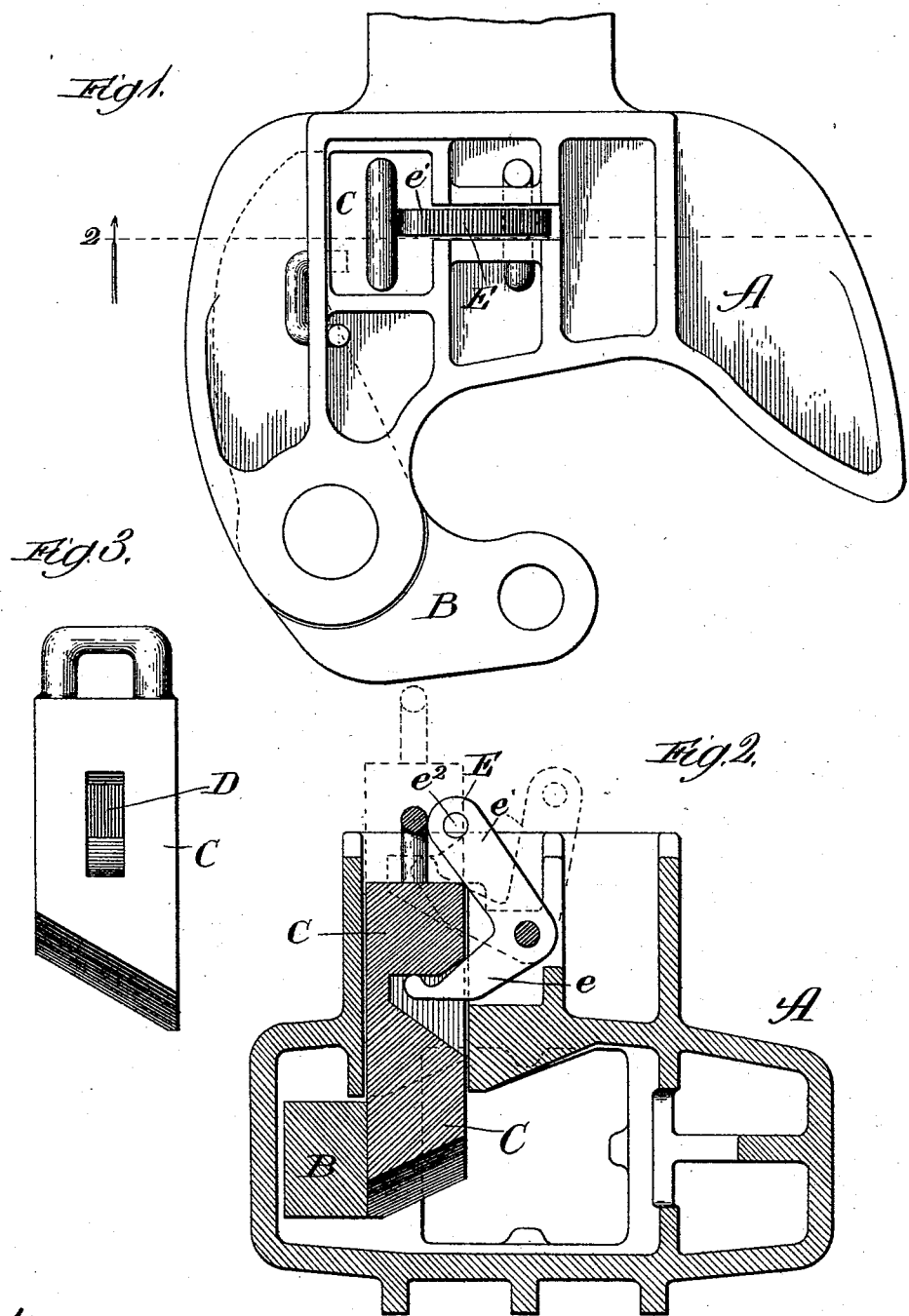

DAVID L. BARNES, OF CHICAGO, ILLINOIS, ASSIGNOR TO THE CONGDON BRAKE SHOE COMPANY, OF SAME PLACE.

CAR-COUPLING.

SPECIFICATION forming part of Letters Patent No. 496,810, dated May 2, 1893.

Application filed February 11, 1893. Serial No. 461,941. (No model.)

*To all whom it may concern:*

Be it known that I, DAVID L. BARNES, of Chicago, Illinois, have invented a certain new and useful Improvement in Car-Couplings, of which the following is a specification.

In changing and putting on new couplers, it frequently happens that a coupler provided with a rotating hook is applied to a car formerly equipped with the Miller coupler, and which is still provided with the Miller uncoupling mechanism, or it may be desired to provide a car, originally equipped with rotating hook couplers, with means for unlocking and releasing the rotating hook, similar to those employed in connection with the Miller coupler. The object of my invention, therefore, is to provide means whereby such uncoupling mechanism may be used equally as well with a rotating hook coupler as with the Miller coupler.

In the drawings, Figure 1 is a plan view of a coupler provided with my improvements; Fig. 2 a cross section on line 2 of Fig. 1, looking in the direction of the arrow; and Fig. 3 a detail of the locking pin.

The coupling head A and rotating hook B may be made in any of the well known forms, and by themselves constitute no part of my invention. The locking pin C may also be made in any desired form. In the drawings I have shown it as substantially rectangular in cross section and beveled at its lower end to permit the tail of the hook to rise and pass under it, when such tail is swung in; but these being unessential features may be varied as desired. This locking pin is further provided with a recess D in one of its faces, made of any desired shape and size.

A bell crank lever, E, is pivoted at any suitable point in the coupling head, one arm of the lever, as $e$, entering the recess D, thereby engaging the locking pin. This end of the lever is preferably, though not necessarily, rounded as shown, to insure its easy operation. The other arm $e'$ of the lever is preferably provided with an eye or opening $e^2$, which is adapted to be connected to the unlocking lever forming a portion of the Miller uncoupling mechanism. This mechanism, being well known, I have not considered it necessary to show it.

Supposing the parts to be constructed and put together as above described, the device operates as follows; supposing the parts to be in the position indicated in dotted lines in Fig. 2, in which position the pin is down to lock the rotating hook. Upon the lever E being rocked toward the right into the position indicated in dotted lines in Fig. 2, its arm $e$ will raise the locking pin into the position also indicated in dotted lines in the same figure, releasing the rotating hook, which may then be swung open. Upon the lever being released, the weight of the locking pin will move it downward, restoring the parts to their normal position.

It will be obvious that the same device may be applied to a coupler provided with a longitudinally or laterally sliding locking pin, by simply changing the pivoting of the bell crank lever.

I claim—

In a car coupler, the combination of a coupler head, a rotating hook, a locking pin, and a bell crank lever pivoted in the locking head, one arm of such lever engaging with the locking pin and the other arm connected with the unlocking mechanism, substantially as described.

DAVID L. BARNES.

Witnesses:
 THOMAS A. BANNING,
 SAMUEL E. HIBBEN.